US008485388B2

(12) United States Patent
Tuan

(10) Patent No.: US 8,485,388 B2

(45) **Date of Patent: *Jul. 16, 2013**

(54) FOLDABLE WATER BOTTLE

(76) Inventor: Ronald Tuan, Nantou (TW)

( * ) Notice: Subject to any disclaimer, the term of this patent is extended or adjusted under 35 U.S.C. 154(b) by 170 days.

This patent is subject to a terminal disclaimer.

(21) Appl. No.: 12/982,443

(22) Filed: Dec. 30, 2010

(65) Prior Publication Data

US 2011/0290753 A1 Dec. 1, 2011

(30) Foreign Application Priority Data

Jun. 1, 2010 (TW) ............................... 99117569 A

(51) Int. Cl.
*B65D 8/14* (2006.01)

(52) U.S. Cl.
USPC ................ 220/666; 220/6; 220/8; 220/212.5; 220/263; 220/283; 220/317; 220/740; 220/759; 220/762; 220/768; 220/770; 206/218; 215/43; 215/241

(58) Field of Classification Search
USPC .................... 206/218, 577; 215/43, 240, 241, 215/242; 220/6, 8, 212.5, 262, 263, 282, 220/283, 317, 318, 817, 710.5, 740, 742, 220/752, 758, 759, 762, 768–770, 756, 783, 220/666

See application file for complete search history.

(56) References Cited

U.S. PATENT DOCUMENTS

| | | | | |
|---|---|---|---|---|
| 561,167 | A * | 6/1896 | Jennings | 220/8 |
| 994,520 | A * | 6/1911 | Irwin | 222/189.07 |
| 1,227,920 | A * | 5/1917 | Maaske | 220/759 |
| 1,258,503 | A * | 3/1918 | Tritle | 16/233 |
| 1,407,131 | A * | 2/1922 | De Gregory | 220/759 |
| 1,711,749 | A * | 5/1929 | Schmitt | 220/264 |
| 3,107,029 | A * | 10/1963 | Rylander | 220/740 |
| 3,261,053 | A * | 7/1966 | Lesher | 16/445 |
| 4,222,493 | A * | 9/1980 | Friedman | 220/8 |
| 5,797,542 | A * | 8/1998 | O'Connor | 229/109 |
| 2004/0113032 | A1* | 6/2004 | Parenteau | 248/147 |
| 2008/0164264 | A1* | 7/2008 | Fung | 220/573.1 |

* cited by examiner

*Primary Examiner* — J. Gregory Pickett
*Assistant Examiner* — Mollie Llewellyn
(74) *Attorney, Agent, or Firm* — Ming Chow; Sinorica, LLC

(57) ABSTRACT

A foldable water bottle has a base, a folding body and a handle device. The folding body is made of silica gel, is mounted on the base and has a connecting ring, a folding segment and a neck. The folding segment is formed on and protrudes from the connecting ring and has multiple folding rings. The neck is formed on the folding segment and has a spout and two inserting mounts. The handle device is detachably connected to the folding body and has an inserting handle and a lid. The inserting handle is connected securely to the neck and has a handle mount and a grip. The lid is connected to the inserting handle and is used to close an opening top of the neck.

8 Claims, 6 Drawing Sheets

231 23 20 233 22 33 31 30 34 32 10

FOLDABLE WATER BOTTLE

The current invention claims a foreign priority to the application of Taiwan 099117569 filed on Jun. 1, 2010.

BACKGROUND OF THE INVENTION

1. Field of the Invention

The present invention relates to a foldable water bottle, and more particularly to a foldable water bottle that can be folded to reduce the volume of the foldable water bottle.

2. Description of Related Art

A conventional water bottle is used to store liquid such as water or drink and usually has a base, a body, a neck, a spout and a handle. The body is formed on and protrudes form the base. The neck is formed on the body opposite to the base and has a front side and a rear side. The spout is formed through the front side of the neck. The handle is formed on and protrudes from the rear side of the neck. Then, users can carry the conventional water bottle by the handle and pour liquid out of the conventional water bottle from the spout.

However, the conventional water bottle has a fixed structure and cannot be folded to reduce the volume of the conventional water bottle and this requires larger space to store the conventional water bottle when the conventional water bottle is not in use and the fixed structure of the conventional water bottle is inconvenient for carriage.

To overcome the shortcomings, the present invention provides a foldable water bottle to mitigate or obviate the aforementioned problems.

SUMMARY OF THE INVENTION

The main objective of the present invention is to provide a foldable water bottle that can be folded to reduce the volume of the foldable water bottle.

The foldable water bottle in accordance with the present invention has a base, a folding body and a handle device. The folding body is made of silica gel, is mounted on the base and has a connecting ring, a folding segment and a neck. The folding segment is formed on and protrudes from the connecting ring and has multiple folding rings. The neck is formed on the folding segment and has a spout and two inserting mounts. The handle device is detachably connected to the folding body and has an inserting handle and a lid. The inserting handle is connected securely to the neck and has a handle mount and a grip. The lid is connected to the inserting handle and is used to close an opening top of the neck.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
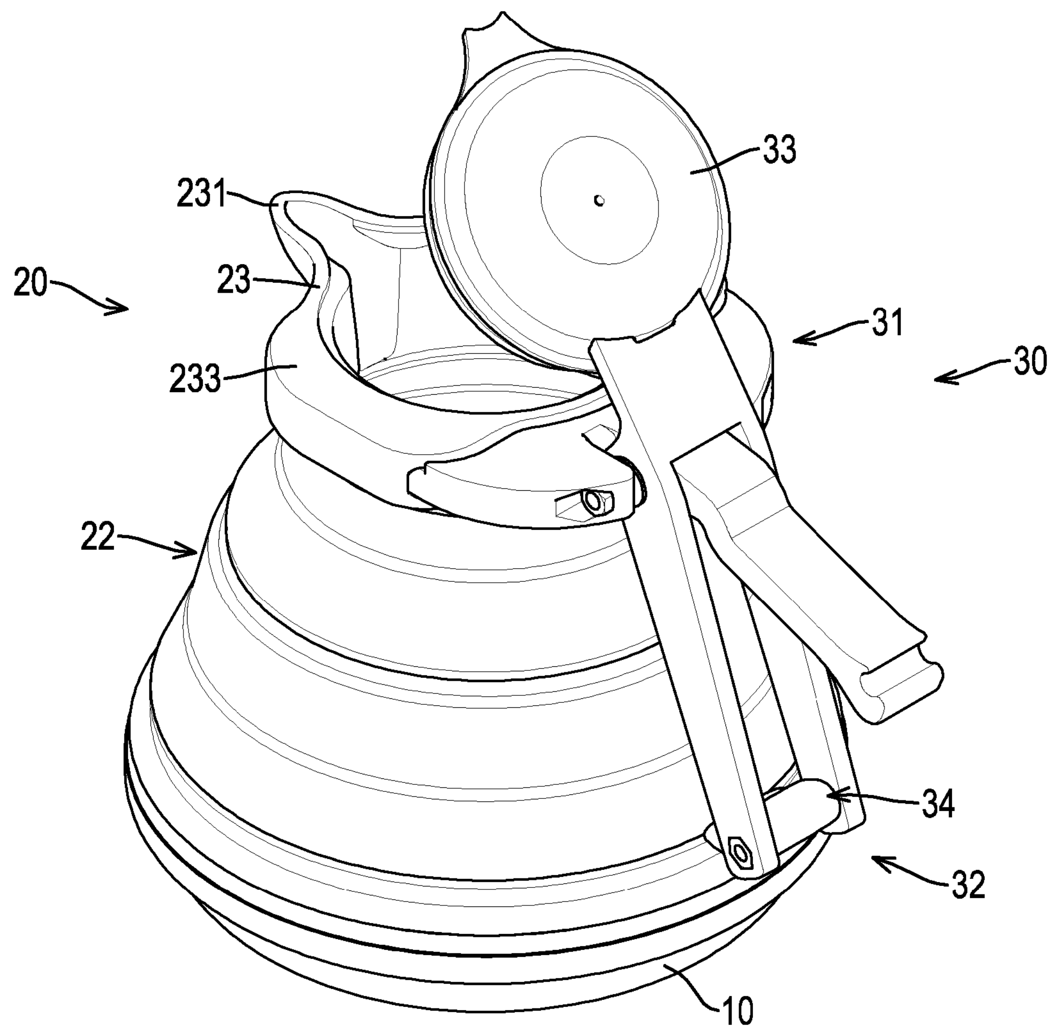
FIG. 1 is a perspective view of a foldable water bottle in accordance with the present invention.
Figure 2:
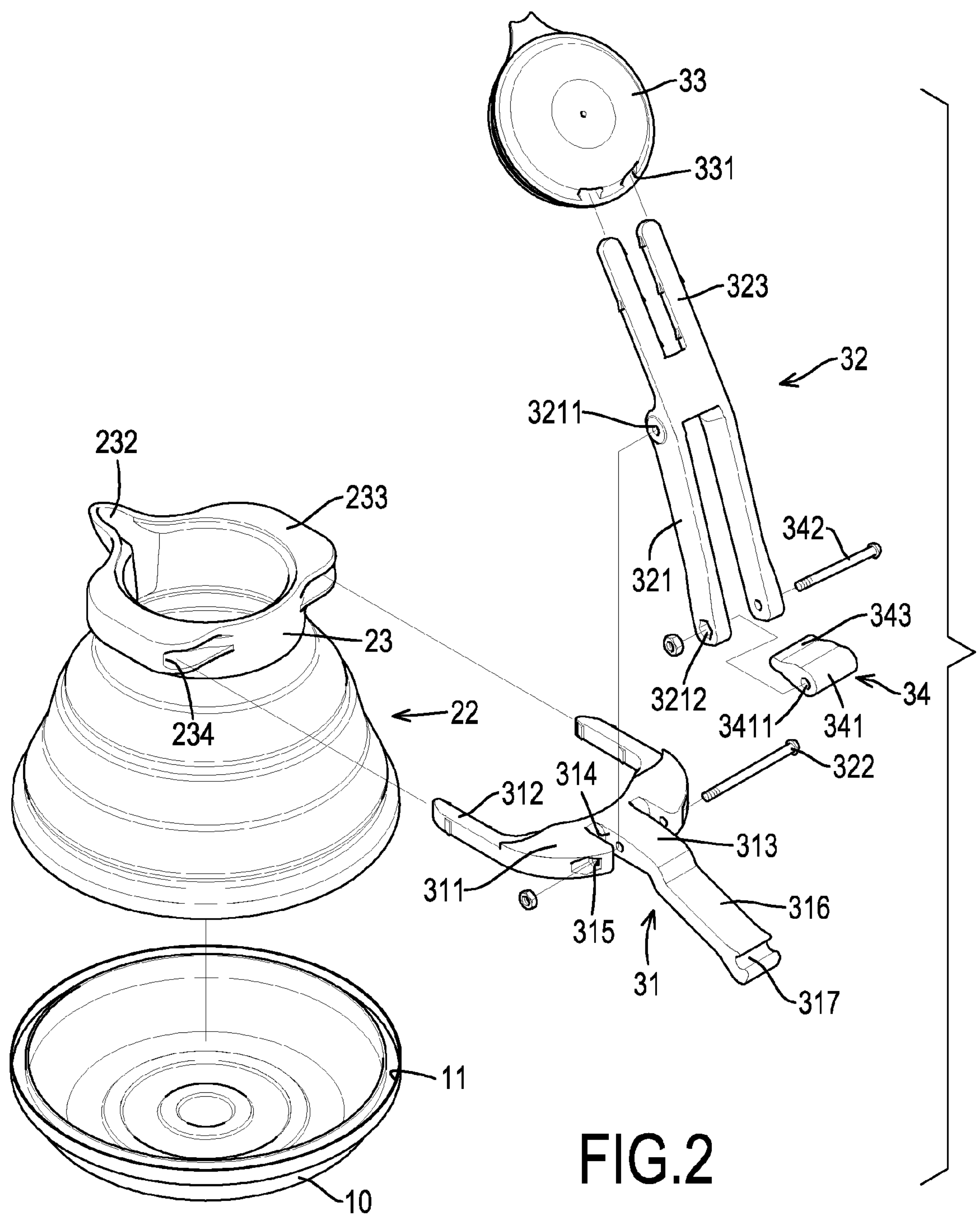
FIG. 2 is an exploded perspective view of the foldable water bottle in FIG. 1.

With reference to FIGS. 1 to 4, a foldable water bottle in accordance with the present invention has a base 10, a folding body 20 and a handle device 30.

The base 10 is a metal basin and has an opening top and a locking groove 11. The locking groove 11 is annularly formed around the opening top of the base 10.

The folding body 20 is made of silica gel as a single piece, is mounted on the opening top of the base 10 and has an interior, a connecting ring 21, a folding segment 22 and a neck 23. The interior of the folding body 20 communicates with the opening top of the base 10.

Figure 4:
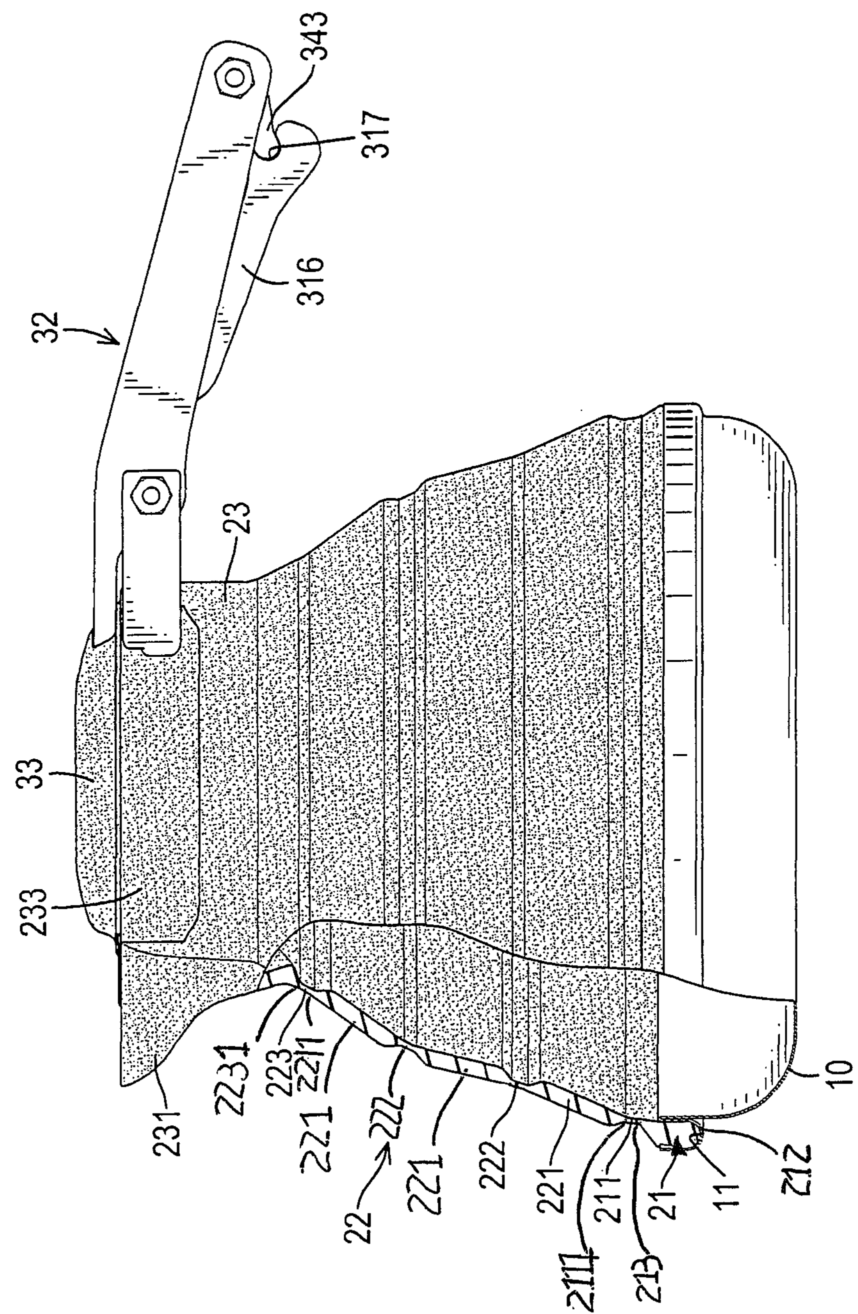
FIG. 4 is a cross sectional side view in partial section of the foldable water bottle in FIG. 1.

The connecting ring 21 is annular, is mounted in and adhered to the locking groove 11 of the base 10 and has a bottom 212, a top 213, a width and a linking section 211. The bottom 212 of the connecting ring 21 is mounted in the locking groove 11 of the base 10 and has a diameter. The top 213 of the connecting ring 21 extends out of the locking groove 11 of the base 10 and has a diameter smaller than the diameter of the bottom 212 of the connecting ring 21. With reference to FIG. 4, the width of the connecting ring 21 is defined as a distance between the bottom 212 and the top 213 of the connecting ring 21. The linking section 211 is formed on the top 213 of the connecting ring 21 and has a top 2111 and a width. The width of the linking section 211 is defined as a distance between the top 213 of the connecting ring 21 and the top 2111 of the linking section 211 and is smaller than the width of the connecting ring 21.

The folding segment 22 is formed on and protrudes from the linking section 211 of the connecting ring 21 and has three folding rings 221, two forming sections 222 and a connecting section 223. The folding rings 221 are continuously formed on the linking section 211 of the connecting ring 21, are formed with each other and each folding ring 221 has a bottom, a top 2211 and a width. The bottom of each folding ring 221 has a diameter and the bottom of the lowermost folding ring 221 is formed on the linking section 211 of the connecting ring 21. The top 2211 of each folding ring 221 has a diameter smaller than the diameter of the bottom of the corresponding folding ring 221. The width of each one of the folding rings 221 is defined as a distance between the bottom and the top 2211 of the folding ring 221. The forming sections 222 are formed on the folding segment 22 between the folding rings 221 and each forming section 222 has a width. The width of each one of the forming sections 222 is defined as a distance between two adjacent folding rings 221 and is smaller than the width of each one of the folding rings 221. The connecting section 223 is formed on the top 2211 of the uppermost folding ring 221 and has a top 2231 and a width. The width of the connecting section 223 is defined as a distance between the top 2231 of the connecting section 223 and the top 2211 of the uppermost folding ring 221 and is smaller than the width of each one of the folding rings 221.

The neck 23 is formed on the folding segment 22 and has a bottom, an opening top, a front side, a rear side, an external surface, a spout 231 and two inserting mounts 233. The bottom of the neck 23 is formed on the connecting section 223 of the folding segment 22. The spout 231 is formed on and protrudes from the front side of the neck 23 and has a channel 232 communicating with the interior of the folding body 20. The inserting mounts 233 are formed on and protrude from the external surface of the neck 23 beside the spout 231 and each inserting mount 233 has a rear side and an inserting hole 234. The inserting hole 234 is formed through the rear side of the inserting mount 233.

The handle device 30 is detachably connected to the folding body 20 and has an inserting handle 31, a rotating handle 32, a lid 33 and a turning board 34.

The inserting handle 31 is connected transversally and securely to the neck 23 and has a handle mount 311, two through recesses 314, a bolt hole 315 and a grip 316. The handle mount 311 is connected to the inserting mounts 233 of the neck 23 and has a front end, a rear end, two inserting bars 312 and an extending arm 313.

The inserting bars 312 are formed on and protrude from the front end of the handle mount 311, are respectively mounted in the inserting holes 234 of the inserting mounts 233 to connect the inserting handle 31 with the neck 23 of the folding body 20 and each inserting bar 312 has a mounting end and a forming end. The mounting ends of the inserting bars 312 are respectively mounted in the inserting holes 234 of the inserting mounts 233.

The extending arm 313 is formed on and protrudes from the rear end of the handle mount 311, is formed with the inserting bars 312 and has a forming end and an extending end. The forming end of the extending arm 313 is formed with the forming ends of the inserting bars 312.

The through recesses 314 are formed through the handle mount 311 between the forming ends of the inserting bars 312 and the extending arm 313. The bolt hole 315 is formed through the forming ends of the inserting bars 312 and the extending arm 313. The grip 316 is formed on and protrudes from the extending end of the extending arm 313 and has a free end, a top face and a holding recess 317. The free end of the grip 316 extends out of the extending end of the extending arm 313. The holding recess 317 is formed on the top face of the grip 316 at the free end of the grip 316.

The rotating handle 32 is pivotally connected to the inserting handle 31 and has two rotating arms 321, a first bolt and nut 322 and two connecting panels 323.

The rotating arms 321 are formed with each other at an interval, are pivotally connected to the inserting bars 312 and the extending arm 313 of the handle mount 311 and each rotating arm 321 has a pivotal end, a holding end, a through hole 3211 and a connecting hole 3212. The pivotal ends of the rotating arms 321 are respectively mounted in the through recesses 314 of the inserting handle 31 between the inserting bars 312 and the extending arm 313. The holding ends of the rotating arms 321 extend out of the free end of the grip 316 of the inserting handle 31. The through holes 3211 are respectively formed through the pivotal ends of the rotating arms 321 and align with the bolt hole 315 of the inserting handle 31. The connecting holes 3212 are respectively formed through the holding ends of the rotating arms 321.

The first bolt and nut 322 is mounted in the through holes 3211 of the rotating arms 321 and the bolt hole 315 of the inserting handle 31 to connect the rotating handle 32 with the inserting handle 31. The connecting panels 323 are respectively formed on and protrude from the pivotal ends of the rotating arms 321.

The lid 33 is connected to the rotating handle 32, is used to close the opening top of the neck 23 and has an external surface and two connecting holes 331. The connecting holes 331 are formed through the external surface of the lid 33 and are connected to the connecting panels 323 of the rotating handle 32. Then, the lid 33 is connected to the inserting handle 31 via the rotating handle 32.

The turning board 34 is pivotally connected to the rotating handle 32, selectively abuts on the grip 316 of the inserting handle 31 and has a mounting end, a holding end, a pivotal segment 341, a second bolt and nut 342 and a holding segment 343. The pivotal segment 341 is formed on the mounting end of the turning board 34, is pivotally mounted between the holding ends of the rotating arms 321 of the rotating handle 32 and has a mounting hole 3411. The mounting hole 3411 is formed through the pivotal segment 341 and aligns with the connecting holes 3212 of the rotating arms 321. The second bolt and nut 342 is mounted in the mounting hole 3411 of the pivotal segment 341 and the connecting holes 3212 of the rotating arms 321 to connect the turning board 34 with the rotating handle 32. The holding segment 343 is formed on the holding end of the turning board 34, is formed with the pivotal segment 341 and selectively mounted in the holding recess 317 of the grip 316 to hold the rotating handle 32 with the inserting handle 31.

Figure 3:
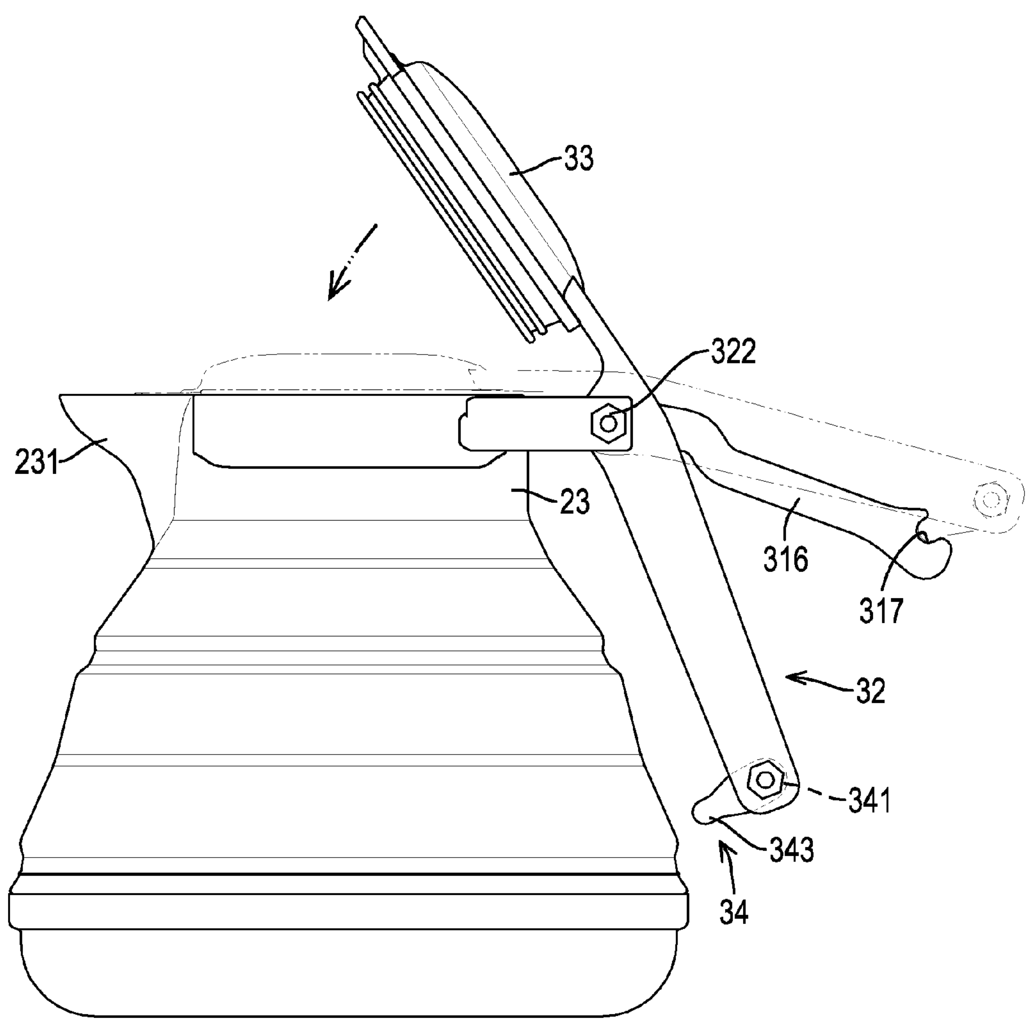
FIG. 3 is an operational side view of the foldable water bottle in FIG. 1.

With reference to FIGS. 1 and 4, when the foldable water bottle in accordance with the present invention is used to store liquid, the interior between the base 10 and the folding body 20 can be used to store liquid and the metal base 10 can be set on a heat source to heat the liquid in the folding body 20 of the foldable water bottle. With reference to FIGS. 3 and 4, the rotating handle 32 can be rotated relative to the inserting handle 31 by the first bolt and nut 322 to enable the lid 33 to move to and mount on the neck 23 to close the opening top of the neck 23. When the lid 33 is mounted on the neck 23, the turning board 34 will move upward with the rotating handle 32 to enable the pivotal segment 341 to pass through the free end of the grip 316, and the holding segment 343 of the turning board 34 can be mounted and held in the holding recess 317 of the grip 316 and this can prevent the lid 33 from separating from the neck 23. When the lid 33 needs to be removed from the neck 23, the user only needs to rotate the turning board 34 relative to the rotating handle 32 to separate the holding segment 343 from the holding recess 317 of the grip 316. Then, the rotating handle 32 can be rotated relative to the inserting handle 31 to enable the lid 33 to separate from the neck 23.

Figure 5:
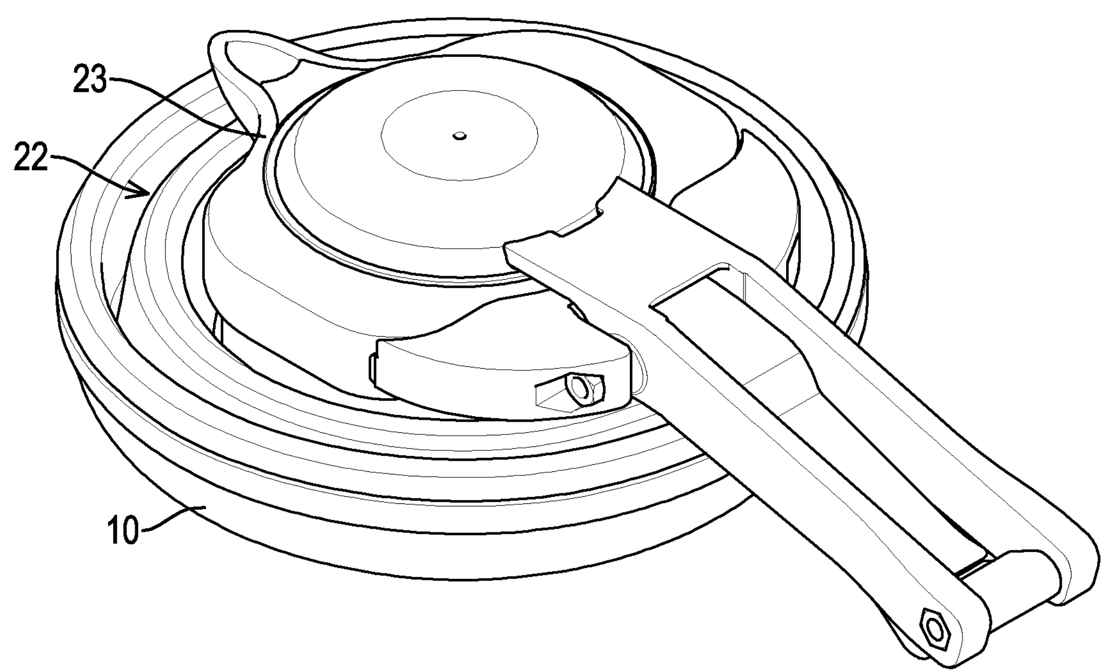
FIG. 5 is an operational perspective view of the foldable water bottle in FIG. 1.
Figure 6:
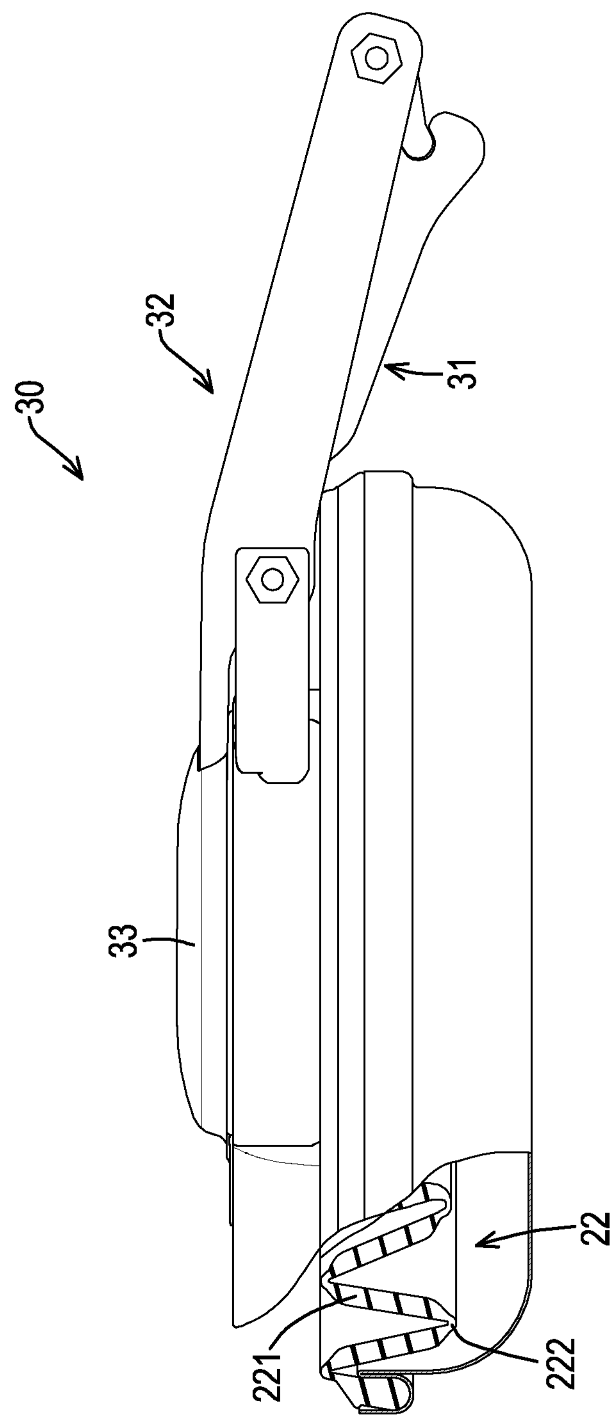
FIG. 6 is a cross sectional side view in partial section of the foldable water bottle in FIG. 5.

With reference to FIGS. 5 and 6, when the foldable water bottle needs to be folded to transport and carry, the user can press the neck 23 downward to fold the folding rings 221 of the folding segment 22. Then, the folding rings 221 and the neck 23 can be folded in the base 10 to reduce the volume of the foldable water bottle as shown in FIGS. 5 and 6.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A foldable water bottle having a base being a metal basin and having
  an opening top; and
  a locking groove annularly formed around the opening top of the base;
a folding body being made of silica gel as a single piece, mounted on the opening top of the base and having
  an interior communicating with the opening top of the base;
  a connecting ring being annular, mounted in and adhered to the locking groove of the base and having
    a bottom mounted in the locking groove of the base and having a diameter;

a top extending out of the locking groove of the base and having a diameter smaller than the diameter of the bottom of the connecting ring;
a width being defined as a distance between the bottom and the top of the connecting ring; and
a linking section formed on the top of the connecting ring and having
a top; and
a width being defined as a distance between the top of the connecting ring and the top of the linking section and smaller than the width of the connecting ring;
a folding segment formed on and protruding from the linking section of the connecting ring and having
multiple folding rings continuously formed on the linking section of the connecting ring, formed with each other and each folding ring having
a bottom and the bottom of the lowermost folding ring formed on the linking section of the connecting ring;
a top having a diameter smaller than the diameter of the bottom of the corresponding folding ring; and
a width being defined as a distance between the bottom and the top of the folding ring; and
a connecting section formed on the top of the uppermost folding ring and having
a top; and
a width being defined as a distance between the top of the connecting section and the top of the uppermost folding ring and smaller than the width of each one of the folding rings; and
a neck formed on the folding segment and having
a bottom formed on the connecting section of the folding segment;
an opening top;
a front side;
a rear side;
an external surface; and
a spout formed on and protruding from the front side of the neck and having a channel communicating with the interior of the folding body; and
a handle device detachably connected to the folding body and having
an inserting handle connected transversally and securely to the neck and having a grip extended out of the inserting handle; and
a lid connected to the inserting handle to close the opening top of the neck.

2. The foldable water bottle as claimed in claim 1, wherein the folding segment has
three folding rings continuously formed on the linking section of the connecting ring and formed with each other; and
two forming sections formed on the folding segment between the folding rings and each forming section having a width defined as a distance between two adjacent folding rings and smaller than the width of each one of the folding rings.

3. The foldable water bottle as claimed in claim 2, wherein the neck has two inserting mounts formed on and protruding from the external surface of the neck beside the spout and each inserting mount having
a rear side; and
an inserting hole formed through the rear side of the inserting mount; and
the inserting handle has a handle mount connected to the inserting mounts of the neck and having
a front end;
a rear end;
two inserting bars formed on and protruding from the front end of the handle mount, respectively mounted in the inserting holes of the inserting mounts to connect the inserting handle with the neck of the folding body and each inserting bar having
a mounting end mounted in the inserting hole of one of the inserting mounts; and
a forming end; and
an extending arm formed on and protruding from the rear end of the handle mount, formed with the inserting bars and having
a forming end formed with the forming ends of the inserting bars; and
an extending end;
wherein the grip is formed on and protrudes from the extending end of the extending arm.

4. The foldable water bottle as claimed in claim 3, wherein the inserting handle has
two through recesses formed through the handle mount between the forming ends of the inserting bars and the extending arm; and
a bolt hole formed through the forming ends of the inserting bars and the extending arm;
the handle device has a rotating handle pivotally connected to the inserting handle and having
two rotating arms formed with each other at an interval, pivotally connected to the inserting bars and the extending arm of the handle mount and each rotating arm having
a pivotal end mounted in one of the through recesses of the inserting handle between a corresponding inserting bar and the extending arm;
a holding end extending the grip of the inserting handle; and
a through hole;
a first bolt and nut mounted in the through holes of the rotating arms and the bolt hole of the inserting handle to connect the rotating handle with the inserting handle; and
two connecting panels respectively formed on and protruding from the pivotal ends of the rotating arms;
the grip has a free end extending out of the extending end of the extending arm; and
the lid has
an external surface; and
two connecting holes formed through the external surface of the lid and connected to the connecting panels of the rotating handle.

5. The foldable water bottle as claimed in claim 4, wherein each one of the rotating arms has a connecting hole formed through the holding end of the corresponding rotating arms; and
the grip has
a top face; and
a holding recess formed on the top face of the grip at the free end of the grip; and
the handle device has a turning board pivotally connected to the rotating handle, selectively abutting on the grip of the inserting handle and having
a mounting end;
a holding end;
a pivotal segment formed on the mounting end of the turning board, pivotally mounted between the holding ends of the rotating arms of the rotating handle and having a mounting hole formed through the pivotal segment and aligning with the connecting holes of the rotating arms;

a second bolt and nut mounted in the mounting hole of the pivotal segment and the connecting holes of the rotating arms to connect the turning board with the rotating handle; and a holding segment formed on the holding end of the turning board, formed with the pivotal segment and selectively mounted in the holding recess of the grip to hold the rotating handle with the inserting handle.

6. A water bottle having a body being made of silica gel as a single piece and having a neck formed on a top of the body and having an opening top;

a front side;

a rear side;

an external surface;

a spout formed on and protruding from the front side of the neck and having a channel communicating with the interior of the body; and two inserting mounts formed on and protruding from the external surface of the neck beside the spout and each inserting mount having a rear side; and an inserting hole formed through the rear side of the inserting mount; and a handle device detachably connected to the body and having an inserting handle connected transversally and securely to the neck and having a handle mount connected to the inserting mounts of the neck and having a front end;

a rear end;

two inserting bars formed on and protruding from the front end of the handle mount, respectively mounted in the inserting holes of the inserting mounts to connect the inserting handle with the neck of the body and each inserting bar having a mounting end mounted in the inserting hole of one of the inserting mounts; and a forming end; and an extending arm formed on and protruding from the rear end of the handle mount, formed with the inserting bars and having a forming end formed with the forming ends of the inserting bars; and an extending end; and a grip formed on and protruding from the extending end of the extending arm; and a lid connected to the inserting handle to close the opening top of the neck.

7. The water bottle as claimed in claim 6, wherein the inserting handle has two through recesses formed through the handle mount between the forming ends of the inserting bars and the extending arm; and a bolt hole formed through the forming ends of the inserting bars and the extending arm;

the handle device has a rotating handle pivotally connected to the inserting handle and having two rotating arms formed with each other at an interval, pivotally connected to the inserting bars and the extending arm of the handle mount and each rotating arm having a pivotal end mounted in one of the through recesses of the inserting handle between a corresponding inserting bar and the extending arm;

a holding end extending the grip of the inserting handle; and a through hole;

a first bolt and nut mounted in the through holes of the rotating arms and the bolt hole of the inserting handle to connect the rotating handle with the inserting handle; and two connecting panels respectively formed on and protruding from the pivotal ends of the rotating arms;

the grip has a free end extending out of the extending end of the extending arm; and the lid has an external surface; and two connecting holes formed through the external surface of the lid and connected to the connecting panels of the rotating handle.

8. The water bottle as claimed in claim 7, wherein each one of the rotating arms has a connecting hole formed through the holding end of the corresponding rotating arms; and the grip has a top face; and a holding recess formed on the top face of the grip at the free end of the grip; and the handle device has a turning board pivotally connected to the rotating handle, selectively abutting on the grip of the inserting handle and having a mounting end;

a holding end;

a pivotal segment formed on the mounting end of the turning board, pivotally mounted between the holding ends of the rotating arms of the rotating handle and having a mounting hole formed through the pivotal segment and aligning with the connecting holes of the rotating arms;

a second bolt and nut mounted in the mounting hole of the pivotal segment and the connecting holes of the rotating arms to connect the turning board with the rotating handle; and a holding segment formed on the holding end of the turning board, formed with the pivotal segment and selectively mounted in the holding recess of the grip to hold the rotating handle with the inserting handle.

* * * * *